United States Patent
Murakami (10) Patent No.: US 7,170,637 B2
(45) Date of Patent: Jan. 30, 2007

(54) METHOD OF REPRODUCING COLOR IN RECORDED MATERIAL

(75) Inventor: Hirokazu Murakami, Fukui (JP)

(73) Assignee: Seiren Co., Ltd., Fukui (JP)

( * ) Notice: Subject to any disclaimer, the term of this patent is extended or adjusted under 35 U.S.C. 154(b) by 1030 days.

(21) Appl. No.: 10/180,970

(22) Filed: Jun. 27, 2002

(65) Prior Publication Data

US 2004/0001208 A1    Jan. 1, 2004

(51) Int. Cl.
*G06K 15/00* (2006.01)
(52) U.S. Cl. .................. 358/1.9; 358/2.1; 358/1.16
(58) Field of Classification Search ................. 358/1.9, 358/1.5, 2.1, 405, 406, 504
See application file for complete search history.

(56) References Cited

U.S. PATENT DOCUMENTS 6,359,976 B1* 3/2002 Kalyanpur et al. ......... 379/134
7,010,695 B1* 3/2006 Mizuguchi .................. 713/185
2002/0159083 A1* 10/2002 Arai et al. ................... 358/1.9

FOREIGN PATENT DOCUMENTS

JP        2000155653 A  *  6/2000

* cited by examiner

*Primary Examiner*—Jerome Grant, II
(74) *Attorney, Agent, or Firm*—Manabu Kanesaka (57) ABSTRACT

In a method of reproducing colors in a recorded material, a profile creation tool is sent from a printing side to a customer, and a profile of a device for forming the image at the customer is created by using the profile creation tool. The profile and image data are transmitted to the printing side, and the color of the image in the recorded material is reproduced at the printing side. This method does not need to use a calorimeter or other expensive color measuring device.

10 Claims, 9 Drawing Sheets

METHOD OF REPRODUCING COLOR IN RECORDED MATERIAL

DETAILED DESCRIPTION OF THE INVENTION

The present invention relates to a method of reproducing accurate colors in a recorded material requested by a customer without using a color-measuring device, such as a calorimeter.

In recent years, it has been widely available to record digital images onto different types of medium such as paper, a film or a fabric using various types of printers in a variety of industrial fields. Especially, in the fashion and interior design field where a design is vital, there has been an increased need for a development of ink-jet printing technology allowing digital images to be dyed or printed onto a fabric in a full range of colors. In the meantime, it has been required to transmit images to be recorded onto such medium to a remote location via a communication means such as Internet in order to represent the colors of the images on the medium accurately and quickly at the remote location. This is particularly true when the medium onto which such images are to be printed is a textile fabric, which includes a printing process followed by heat treatment and soaping processes generally practiced in a dyeing or printing shop or house. Therefore, it has been urgently required to develop and implement a system to allow the shop to reproduce colors in a recorded material requested by a customer for accurate representation of the colors onto the customer's desired recording medium.

Certain techniques have been already known to reproduce colors in a recorded material, including a general method designed to use a profile of a device used in a color data recording process as typically represented by the ICC (International Color consortium) device profile. The ICC device profile is known to use physical values obtained by a calorimeter measuring the XYZ system known as the CIE (Commission Internationale de l' Eclairage) standard colorimetric system or other color measuring instruments.

However, the above-mentioned method using a calorimeter or other color measuring instruments for creating the device profile needs to prepare a large quantity of color patches, and match colors between the reading and measurement values. Accordingly, the amount of work involved in the method becomes too large to proceed quickly.

In addition, if the device undergoes any changes or degradation with time, the device profile must be reproduced according to such changes or degradation in the device. A customer needs to use a calorimeter and a profile creation software tool to update the profile of the device regularly. However, such a device arid a tool are expensive, imposing a large financial burden on the customers, especially a small entity like an individual.

In the meantime, therefore, a method has been proposed to create such a device profile without using a calorimeter or other color measuring instrument, as disclosed in Japanese Patent Publications (KOKAI) No. 06-46448 and No. 11-252392. In order to reduce a mismatch between the devices based on differences in their color representation characteristics, the method performs color matching by capturing color in a standard color patch with a scanner or other similar tool to create a profile as a reference for correction of the device profile.

However, in the above-mentioned prior art method using the relative color matching, although it is possible to do color matching between devices used internally at a customer, it is totally impossible between the devices at different places like a customer and a printing house. The customer and the printing house need to share the same device for calibration (such as a scanner). An alternative would be exchanging color charts between the customer and the printing house, but it can not take advantage of usefulness and convenience of the Internet.

It is therefore an object of the present invention to provide a method of accurate and speedy color matching between a printing house and a customer in an easier and simpler manner when reproducing the color in a recorded material requested by a customer. The method uses a standard color space similar to the ICC profile, but does not need any expensive calorimeter or other color measuring instruments.

Further objects and advantages of the invention will be apparent from the following description of the invention.

SUMMARY OF THE INVENTION

The first aspect of the present invention is to provide a method of reproducing color in a recorded material requested by a customer for accurate representation of the color onto the customer's desired recording medium without using any color measuring devices, such as a calorimeter. First, the dyeing or printing house, i.e. maker, provides the customer with a profile creation tool so that the customer can use the profile creation tool to create a profile of a device forming the recorded material. Then, the customer transmits the profile to the dyeing or printing house together with image data of the recorded material as digital data. The dyeing or printing house processes the data to reproduce the color in the recorded material.

The second aspect of the present invention is to provide a method of reproducing color in a recorded material requested by a customer for accurate representation of the color on the customer's desired recording medium without using any color measuring devices, such as a calorimeter, in which the customer provides the dyeing or printing house, i.e. maker, with the image data as a source of the recorded material and basic data of the profile of a device forming the recorded material so that the dyeing or printing house can use the basic data to create the profile of the recorded material and process the profile data together with the image data of the recorded material to reproduce the color in the recorded material.

The recorded material in the present invention includes, without limitation, a printed material, a picture, a photograph and other recording medium with any color data recorded onto it, which is generally prepared by a customer and provided to the dyeing or printing house as a sample to be presented.

According to the present invention, in case the recorded material is a printed material printed by the user, the profile is a printer profile used to create the printed material, and in other cases, the profile is a digital imaging device.

The present invention enables the dyeing or printing house to reproduce color in the recorded material requested by the customer for accurate representation of the color onto the customer's desired recording medium without any calorimeter or other color measuring instruments. Instead, the customer and the dyeing or printing house use the profile creation tool.

According to the first aspect of the present invention, the dyeing or printing house provides the customer with the profile creation tool so that the customer can use the tool to create the profile of the device used in the printed material. The customer then transmits the device profile to the dyeing or printing house together with the image data as a source of the recorded material via the Internet, for example. This eliminates the customer's need for an expensive colorimeter or other color measuring instrument or any relevant special technical knowledge, only requiring the customer to transmit the above-mentioned profile and the image data to the dyeing or printing house, wherein the digital data is used to reproduce the color in the recorded material as requested by the customer.

According to the second aspect of the present invention, the profile creation tool is retained at the dyeing or printing house, and the customer needs to transmit only the image data as a source of the recorded material and basic data for the profile of the device to the dyeing or printing house. The printing house then uses the basic data to create the profile of the device and process the device profile together with the image data of the recorded material to reproduce the color in the recorded material. The second aspect of the present invention, as compared with its first aspect described above, can reduce the amount of work at the customer side in the color reproduction process, consequently simplifying the process, as well as having the advantage of eliminating the customer's need for familiarity with the profile creation tool.

The profile creation tool of the present invention contains application programs for dealing with the color data representing color spaces as their corresponding absolute values, printing and other relevant conditions and color conversion. Therefore, by sharing the same tool at the dyeing or printing house and the customer, the color matching process between their respective recording devices can be performed based on the absolute values, thereby improving the accuracy in reproducing color in the recorded material. Also by using the Internet or other similar communication network, the tool enables the color reproduction to be performed speedily and accurately.

DETAILED DESCRIPTION OF PREFERRED EMBODIMENTS

Figure 14:
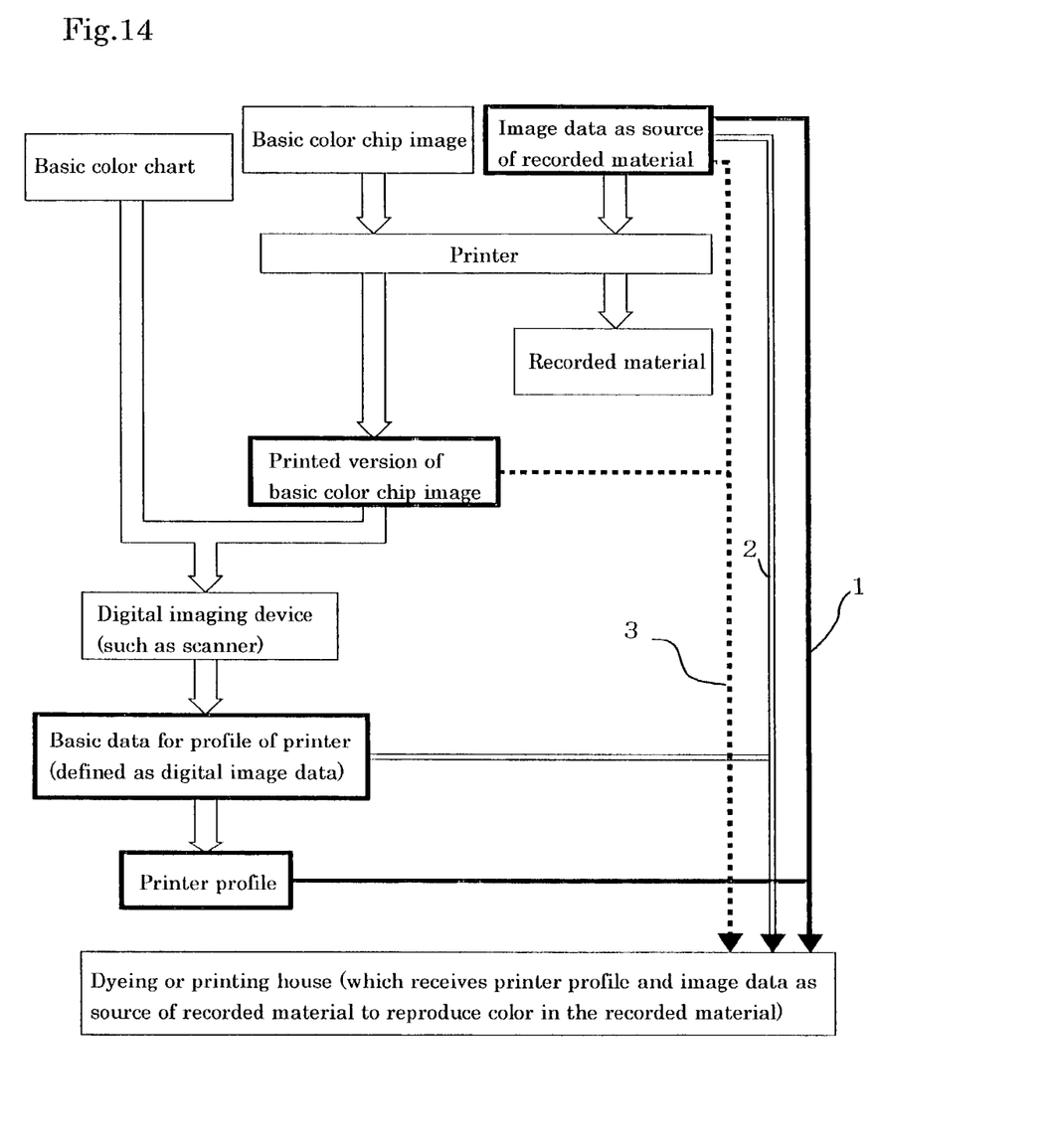
FIG. 14 is a block diagram showing a method of reproducing a color.

Hereunder, embodiments of the invention will be explained with reference to the accompanied drawings. FIG. 14 is a block diagram showing an embodiment of the present invention, representing a flow of data from a customer to a dyeing or printing house to reproduce requested colors. Line 1 in the block diagram represents the first aspect of the present material. Line 2 in the block diagram represents the second aspect of the present invention, in which the customer provides the image data to the dyeing or printing house as the source of the recorded material and basic data. Line 3 in the block diagram represents the second aspect of the present invention, in which the recorded material is a printed material created by the customer, and the customer provides the dyeing or printing house with a printed version of basic color chip image and the image data as the source of the recorded material. As can be seen from the block diagram, the embodiments of the present invention represented by lines 2 and 3 use the data created in an intermediate process of the first embodiment represented by line 1.

Figure 1:
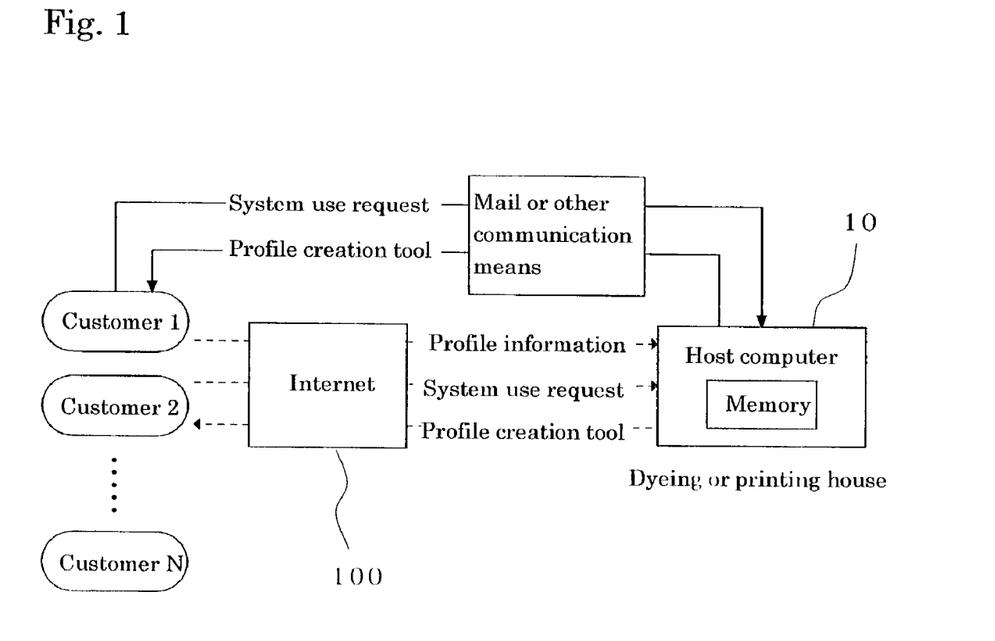
FIG. 1 is a view showing a configuration of a system representing a concept of the present invention.

FIG. 1 shows a configuration of a system representing a concept of the present invention. The following description of the present invention focuses on the first aspect, in which the recorded material is a printed material created by the customer, but the present invention is not limited to the first aspect.

In FIG. 1, the customer first makes a request to the dyeing or printing house, i.e. maker, to use the system via the Internet 100. When a host computer 10 at the dyeing or printing house receives the request, the dyeing or printing house sends the profile creation tool to the customer. The customer then uses the profile creation tool to create a profile of the printer, and sends the device profile as profile information including the image data as the source of the recorded material (not shown) to the dyeing or printing house. The dyeing or printing house uses the information as the basis to reproduce the color in the recorded material as requested by the customer.

The above-described process according to the present invention is based on the Internet for communication of the information. As illustrated in FIG. 1, the present invention can use other communication means, including, but not limited to, mail, facsimile and mobile phone transmission. In general, the Internet is used. FIG. 3 to FIG. 6 shows flow charts that explain a process and steps that the dyeing or printing house and the customer use.

Figure 2:
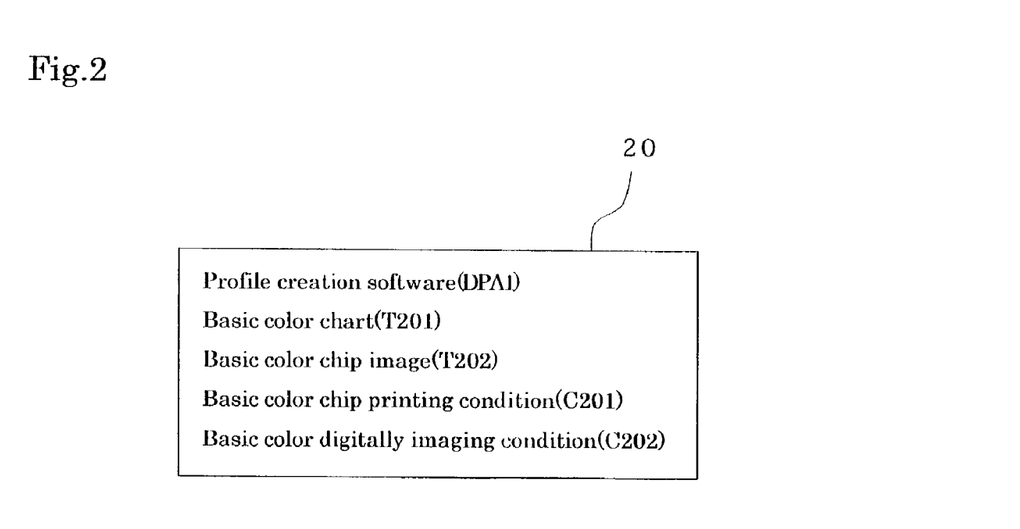
FIG. 2 is a diagram showing a content of a profile creation tool of the present invention.

FIG. 2 is a diagram showing a content of the profile creation tool of the present invention. The profile creation tool 20 is a tool containing data and applications concerning a creation of the profile of the device. The profile creation tool 20 according to the present invention, in addition to profile creation software (DPA1), includes a basic color chart (T201), a basic color chip image (T202), a basic color chip printing condition (C201) and a basic color digitally imaging condition (C202).

The basic color chart (T201) is a color chart having a plurality of specified basic colors. Values of the XYZ, CIE or other similar system representing the basic colors are commonly known in the dyeing or printing house, types, quantity and size of which are sufficient for the dyeing or printing house to reproduce colors in a printed material.

In the basic color chart referred to hereinafter in the description of the present invention, the values are represented in the XYZ system.

The basic color chip image (T202) is a color chip image with a plurality of the specified basic colors. The dyeing or printing house already knows values of the RGB system representing the basic colors. Therefore, types, quantity and size of the values are sufficient for the dyeing or printing house to reproduce colors in a printed material.

As long as the dyeing or printing house acknowledges the basic color chart and color chip image (T201/T202), conditions for the respective color types do not need to correlate to those for the number of colors. The basic color chart and color chip image can be the ones standardized in ANSI (American National Standard Institute) standard IT8.7/2, but not limited to such a standard.

The basic color chip printing condition (C201) refers to a condition concerning a size of a printed version when the customer prints the basic color chip, and does not limit general printing conditions such as a type of a printer, a paper, a coloring material or color correction.

The basic color digitally imaging condition (C202) refers to a condition concerning resolution and a size of a digitally imaged version when the customer is digitally imaging a printed version of the basic color chip image and the basic color chart, and does not limit general imaging conditions such as a type of a device, a color temperature and color correction. The imaging device in the present invention includes a scanner or a digital camera.

Figure 3:
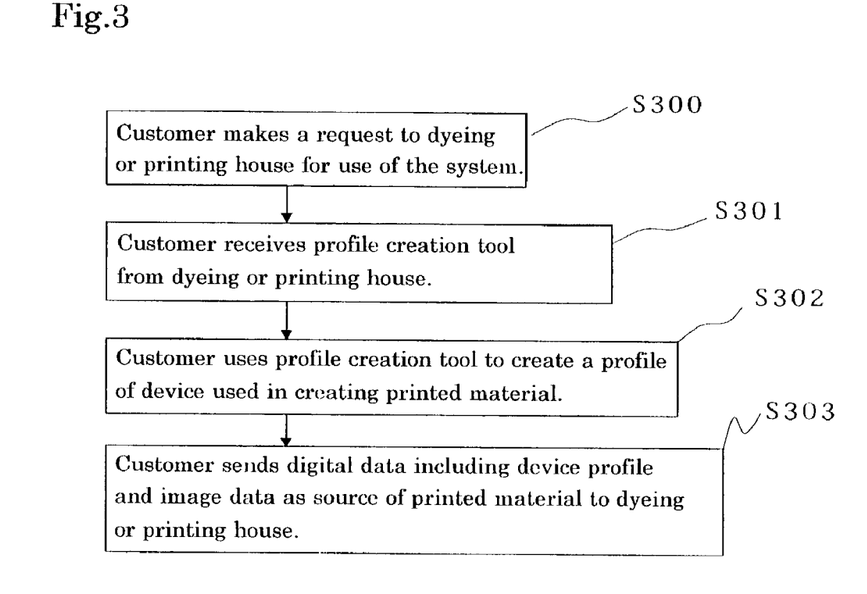
FIG. 3 is a flow chart showing steps when a customer uses the system of the invention.

FIG. 3 is a flow chart showing steps when the customer uses the system. First, the customer makes a request to the dyeing or printing house for the use of the system (S300) and receives the profile creation tool 20 from the dyeing or printing house (S301). Then, the customer uses the profile creation tool to create a profile of a printer according to the flow shown in FIG. 4 (S302) and sends digital data including the profile of the printer and the image data as a source of the printed material to the dyeing or printing house (S303).

Figure 4:
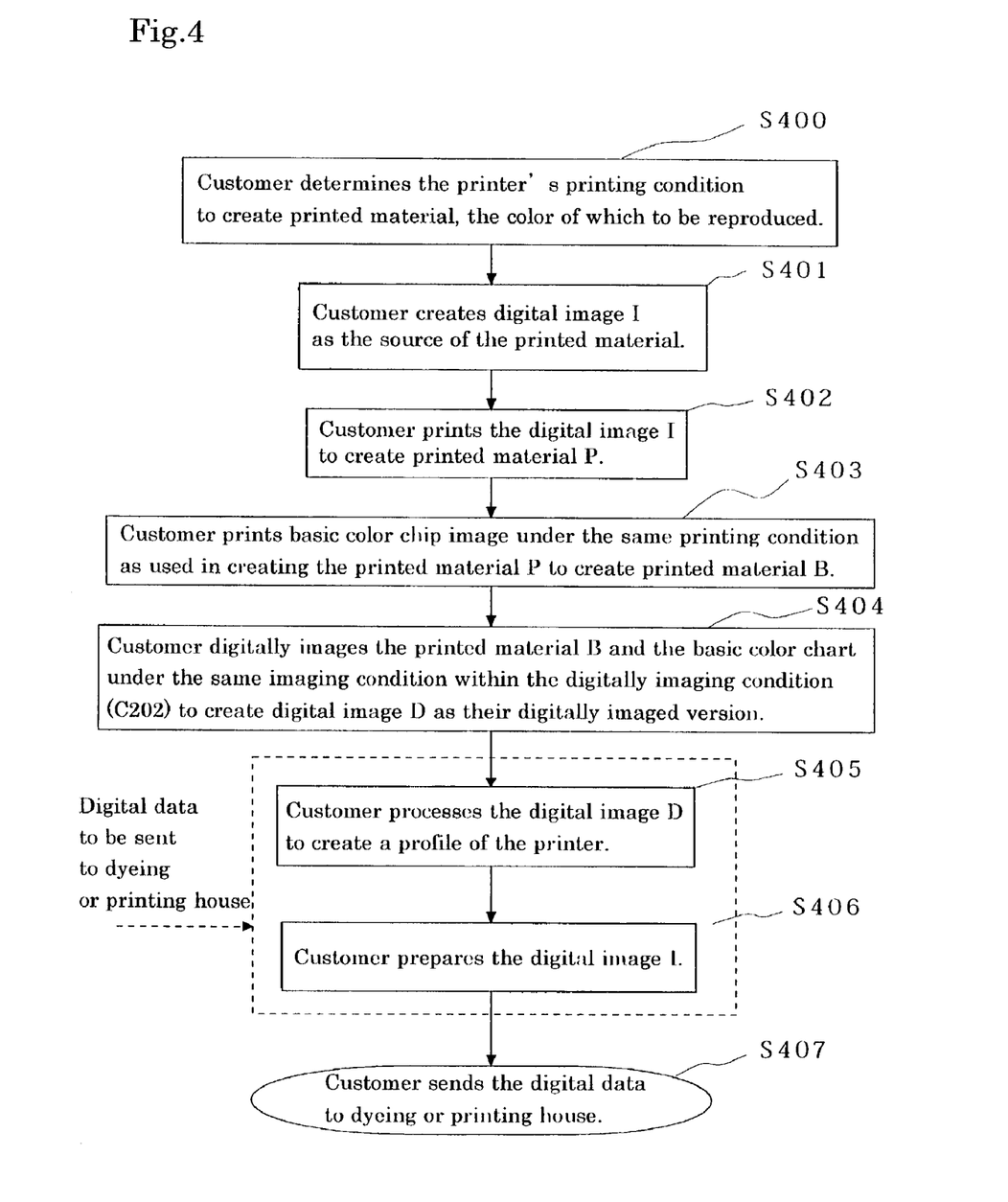
FIG. 4 is a flow chart showing steps when the customer creates data to be sent.

FIG. 4 is a flow chart showing steps when the customer uses the profile creation tool 20 to create data to be sent to the dyeing or printing house.

First, the customer determines a printing condition within the basic color chip printing condition (C201) shown in FIG. 2 so as to create a satisfactory printed material (S400). Then, a digital image I is created as a source of the printed material (S401), and the digital image I is printed to create a printed material P (S402).

Next, the customer prints the basic color chip image (T202) shown in FIG. 2 under the same printing condition as that used in creating the printed material P to create a printed material B as its printed version (S403).

Thereafter, the customer creates digitally images D of the printed material B and the basic color chart under the same imaging condition within the digitally imaging condition (C202) shown in FIG. 2 (S404).

Finally, the customer processes the digital image D using the profile creation tool 20 to create a profile of the printer (S405) and send digital data including the printer profile and the digital image I (S406) to the dyeing or printing house (S407).

Figure 5:
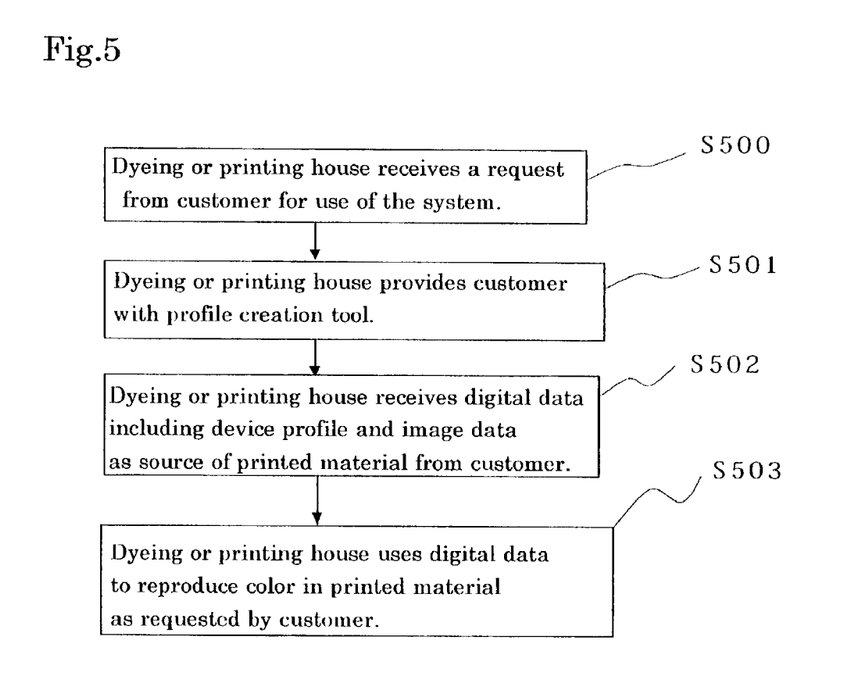
FIG. 5 is a flow chart showing steps when a printing house uses the system of the invention.

FIG. 5 is a flow chart showing steps when the dyeing or printing house uses the system. When the dyeing or printing house receives the request from the customer to use the system (S500), the dyeing or printing house provides the customer with the profile creation tool 20 (S501). Then, the dyeing or printing house receives the printer profile and digital image I as the source of the printed material from the customer (S502), and reproduces the colors in the printed material as requested by the customer (S503). As call be understood by a person with an ordinary skill in the art, it is possible to reproduce colors from a profile of a printer and image data as a source of printed material.

Figure 6:
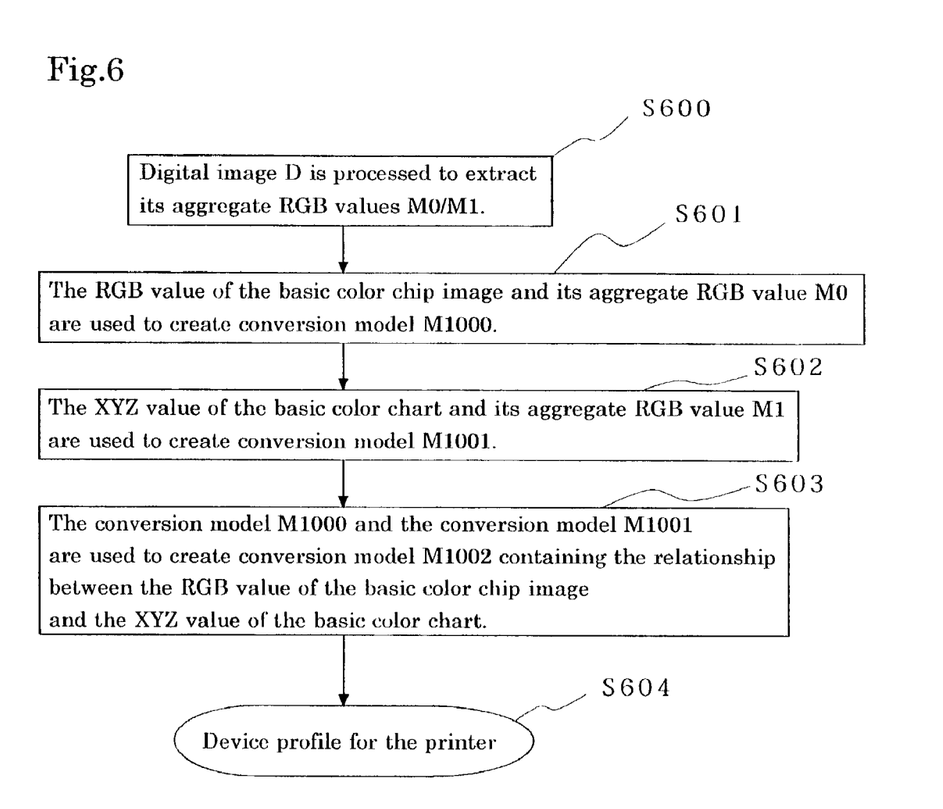
FIG. 6 is a flow chart showing steps of creating a profile.

FIG. 6 is a flow chart showing steps to create the profile. According to the present invention, basic data of the profile of a printer is the digital image D including two types of digitized image data, namely the printed material B of the basic color chip image and the basic color chart.

The first step is extracting RGB values M0/M1 representing each color patch contained in the digital image D (S600).

Figure 7:
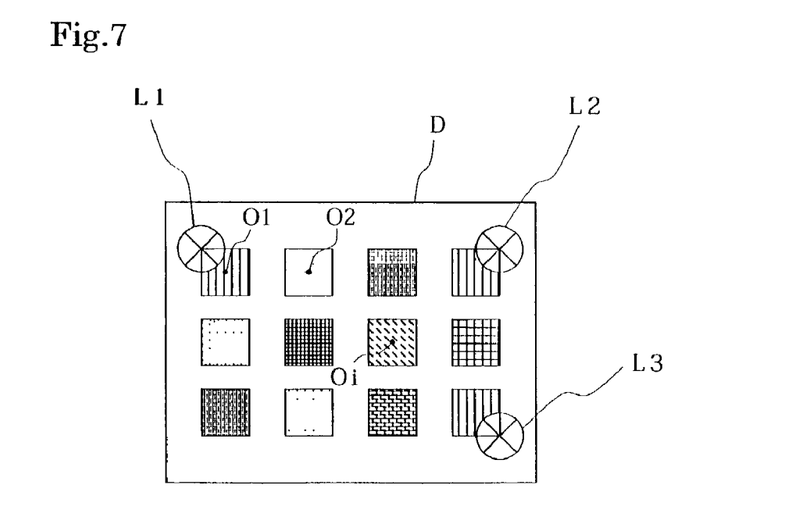
FIG. 7 is an explanatory chart showing a process of extracting a RGB value of a digital image.

FIG. 7 is a digital image representing the printed version of the basic color chip image. As shown in FIG. 7, in the step of extracting M0/M1, the aggregate RGB value MO is obtained by defining the digital image D region (L1, L2, L3), determining center coordinates as O1, O2 from the number of colors in horizontal and vertical directions in each color patch defined as a small square, and determining a partially average RGB value in each color patch. The aggregate RGB value M1 is obtained from the digital image representing the basic color chart.

Figure 13:
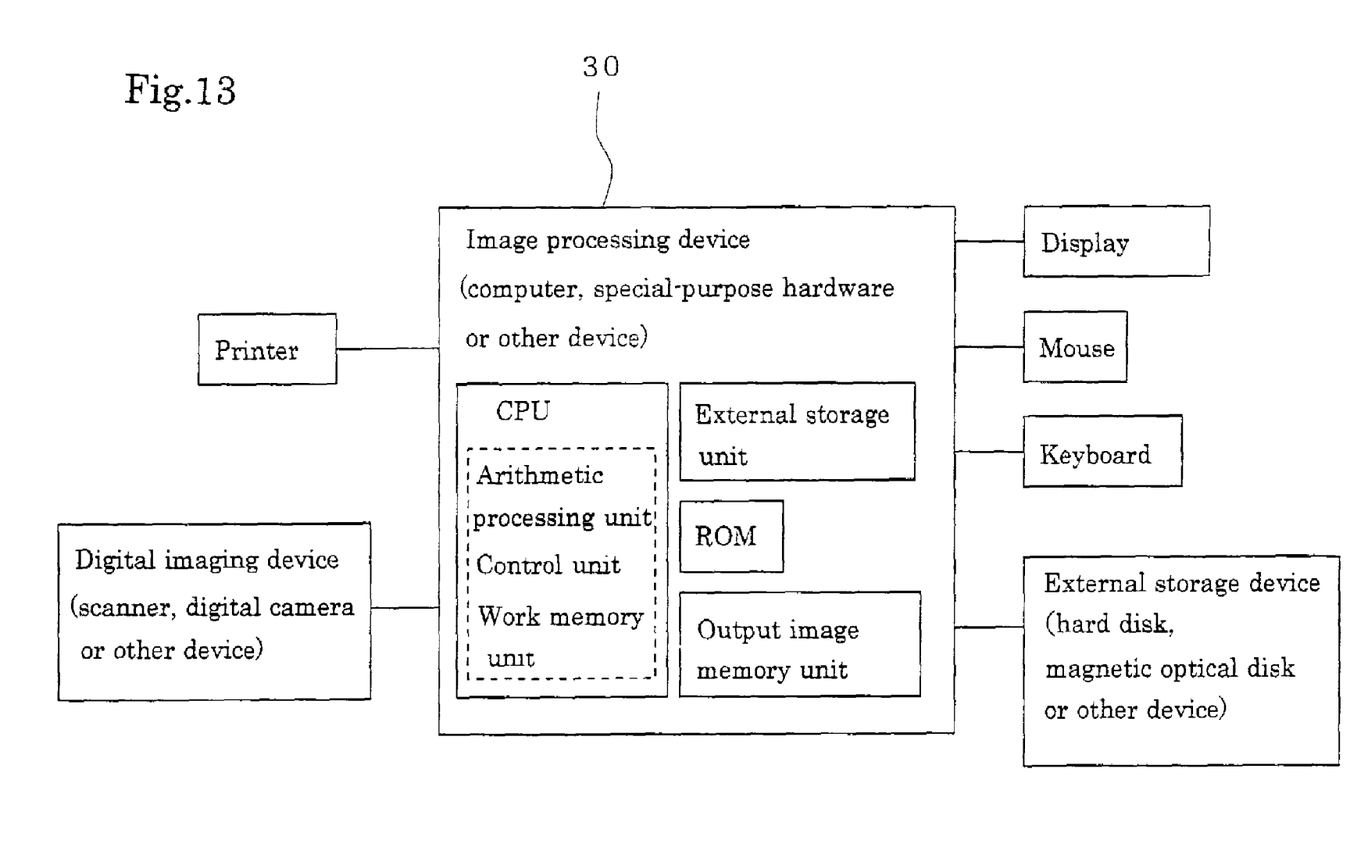
FIG. 13 is a block diagram showing a configuration of an image processing apparatus.

As can be understood by a person with an ordinary skill in the art, it is possible to perform such steps by using a programmed process on the image processing apparatus 30 that has store, displaying and operating means (as shown in FIG. 13).

Then, the RGB value of the basic color chip image and its aggregate RGB value M0 are used to create a conversion model M1000 (S601). The XYZ value of the basic color chart and its aggregate RGB value M1 are used to create a conversion model M1001 (S602). The conversion models referred to here represent LUT (Look Up Table). The LUT according to the present invention is, for example, a three-dimensional table in which the response values for typical input signals are stored to determine a response value for an input signal with reference to the representative points in the table using the three-dimensional smoothing.

Thereafter, the conversion model M1000 and the conversion model M1001 are used to create a conversion model M1002 as a device profile for the printer (S603/S604).

Figure 8:
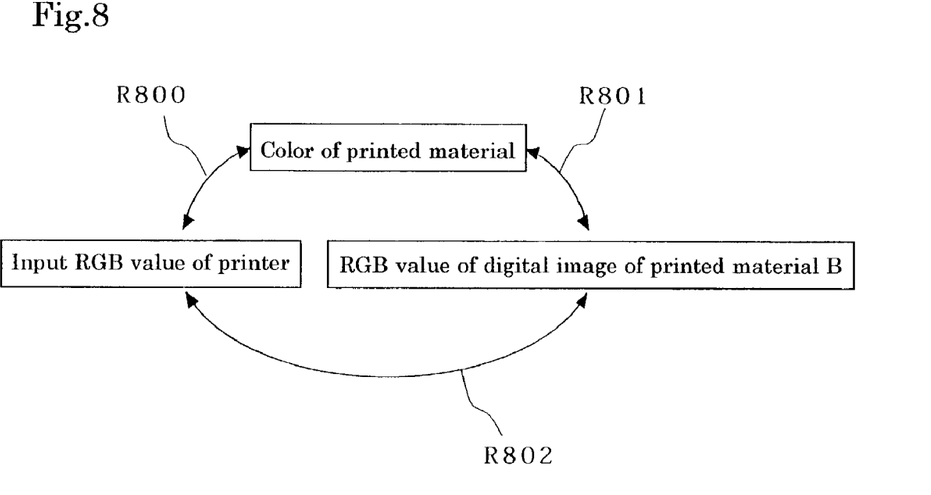
FIG. 8 is a view showing a relationship of color information concerning a printed basic color chip image.

In the above-mentioned conversion model, FIG. 8 shows a relationship of the color information concerning the printed version of the basic color chip image in the digital image D. The digital image D contains image data obtained by digitally imaging the printed material of the basic color chip image. Accordingly, the RGB value of the basic color chip image becomes the RGB value input into the printer. The digital image D contains a relationship between the input RGB value of the printer and the color of the printed material P (R800), and a relationship between the color of the printed material and the RGB value M0 obtained from the digital image D (R801). From both relationships and through the color of the printed material P, a relationship between the input RGB value of the printer and the RGB value MO obtained from the digital image D (R802) is contained as well.

Figure 9:
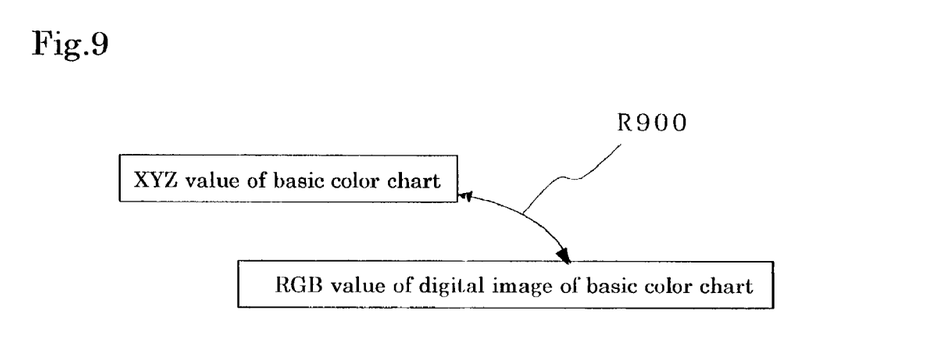
FIG. 9 is a view showing a relationship of color information concerning a basic color chart.

FIG. 9 shows a relationship of the color information concerning the basic color chart in the digital image D. The digital image D contains image data obtained by digitally imaging the basic color chart. Accordingly, the digital image D contains a relationship between the XYZ value of the basic color chart and the RGB value M1 obtained from the digital image D (R900).

Figure 10:
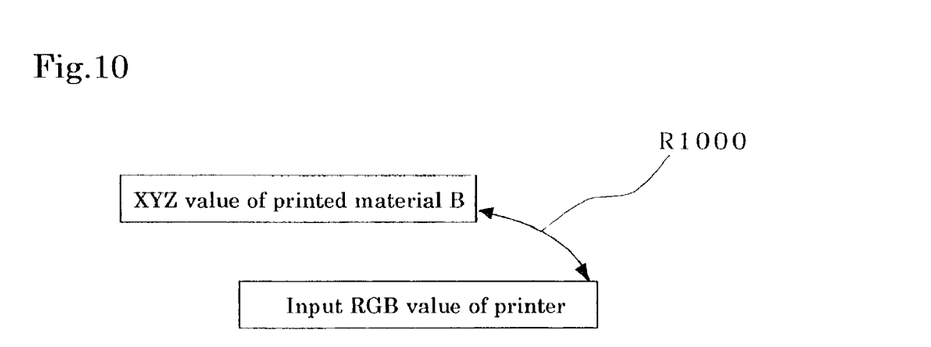
FIG. 10 is a view showing a relationship of color information in a profile.

In addition, FIG. 10 shows a relationship of the color information in the profile of the printer. The profile of the printer contains a relationship between the XYZ value of the printed material and the input RGB value of the printer (R1000). As can be understood by a person with an ordinary skill in the art, in the above-described conversion model, the Neugebauer system or a router condition may be used other than the LUT.

Figure 11:
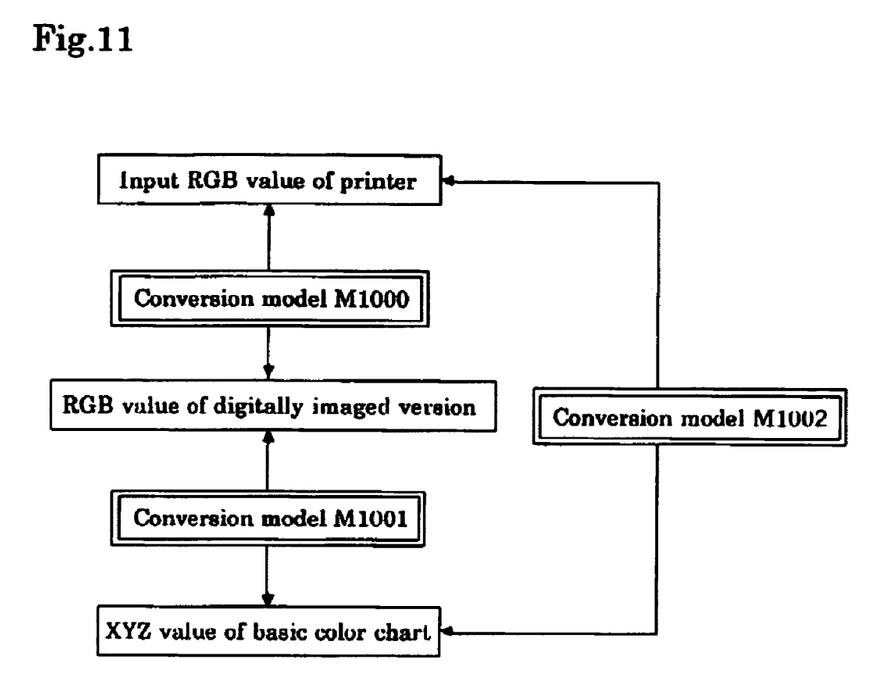
FIG. 11 is a view showing a relationship of a conversion model.

According to the present invention, as illustrated in FIG. 11, the relationship between the input RGB value of the printer and the RGB value obtained from the digital image D is used to create a conversion model M1001. Since the digital image D is the image data obtained under the same condition in both relationships (R802/R900), a relationship between the input RGB value of the printer and the XYZ value of the basic color chip image is established through the RGB value of the digital image D. Therefore, the conversion model M1000 and conversion model M1001 can be used to create a conversion model M1002.

As can be understood by a person with an ordinary skill in the art, the above-described relationship between the input RGB value of the printer and the XYZ value of the basic color chip image is equivalent to the relationship between the XYZ value of the printed material and the input RGB value of the printer (R1000) shown in FIG. 10, thus the conversion model M1002 can be regarded as the profile of the printer.

Figure 12:
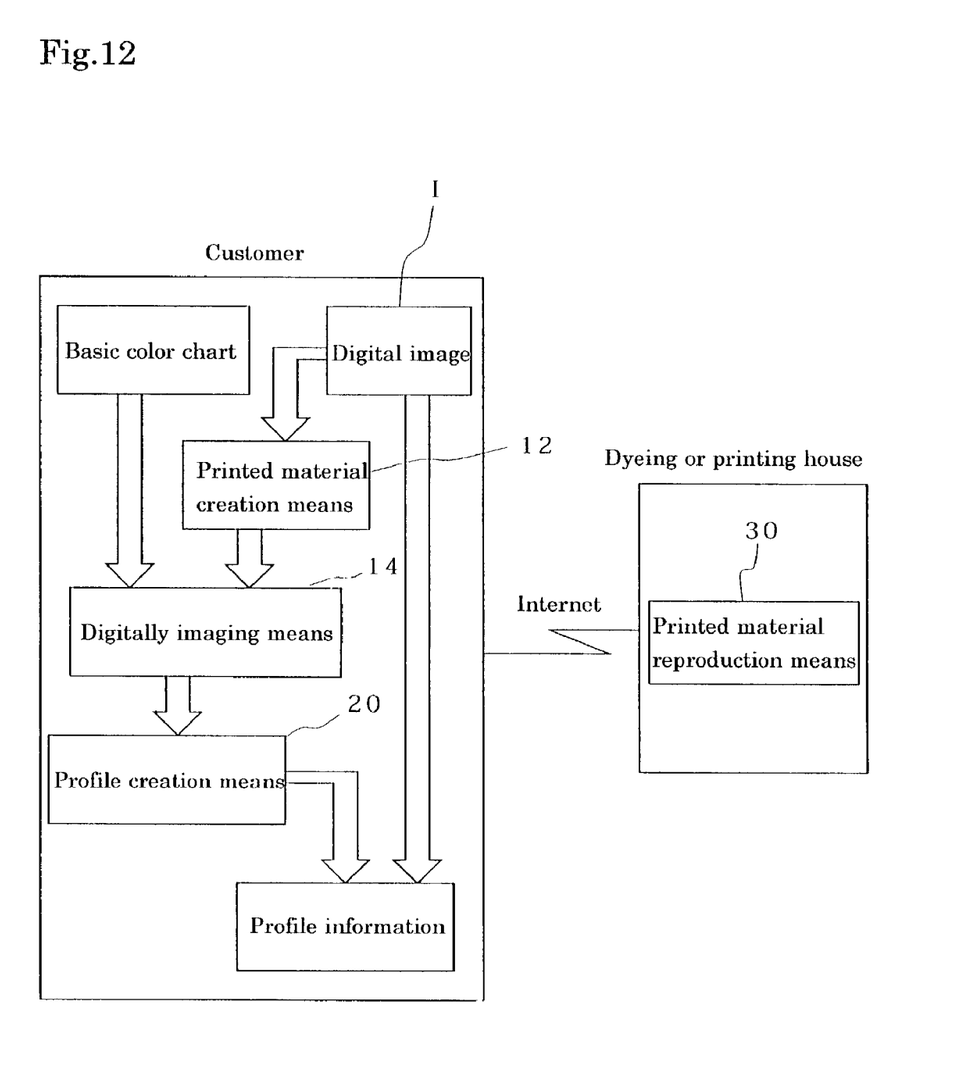
FIG. 12 is a block diagram showing a configuration of the system of the present invention at the printing house and the customer.

FIG. 12 is a block diagram showing an example of a configuration of the system of the present invention in the dyeing or printing house and the customer. FIG. 13 is a block diagram illustrating a detailed example of the configuration of printed material reproduction means as shown in FIG. 12.

In FIG. 12, numeral 12 is a device for creating the printed version of the digital image I as a printed material and numeral 14 is a device for digitally imaging the basic color chart and the printed material P to be used at the customer to create a profile of the printer using the profile creation means 20 provided from the dyeing or printing house and send the printer profile as profile information including the digital image I to the dyeing or printing house. The printing house uses the profile information to reproduce the color in the printed material using the printed material reproduction means 30 (like the image processing device in FIG. 13) for its representation onto the recording medium.

In the above-described embodiment of the present invention, the color value of the image data is represented as the RGB value, but the representation system can be applicable to a variety of such systems as CMYK, L*a*b and XYZ as well. In addition, the above-describe embodiment of the present invention can be modified so that the information to be sent from the customer is changed to basic data for the profile of the printer and printed material of the basic color chip image for transfer of the profile creation process to the dyeing or printing house.

Further, according to the present invention, if the recorded material is a picture, a photograph or other recorded medium with no image data as its source, it can be processed by a scanner, digital camera or other digital imaging devices to create its digitally imaged version as the image data. In this case, the process in FIG. 6 is modified to omit the basic color chip image so that the conversion model M1001 in FIG. 11 can be used as a profile of the digital imaging device to reproduce the color in the recorded material from the digital image as its source. However, the digital image used in this configuration of the system may contain printed material's surface roughness, dust and other noise, and moiré upon digitally imaging. Therefore, in the color reproduction for a recorded material, the image data should be preferably used as the source of the recorded material as described in the afore-mentioned embodiment of the present invention.

should be preferably used as the source of the recorded material as described in the afore-mentioned embodiment of the present invention.

As described above, the system according to the present invention allows a dyeing or printing house, i.e. maker, to reproduce colors in a recorded material without using any calorimeter or other expansive color measuring instrument on either side. The customer is provided with the profile creation tool to create a profile of the device used in creating the recorded material and sends the device profile as digital data including the image data as the source of the recorded material to the dyeing or printing house. The printing house uses the digital data to reproduce the colors in the recorded material accurately and speedily as requested by the customer.

In the case that the profile creation tool is not used or is not needed, the customer just sends the digital data including the profile basic data as a base of profile creation and the image data as the source of the recorded, resulting in more simplified operation at the customer.

While the invention has been explained with reference to the specific embodiments of the invention, the explanation is illustrative and the invention is limited only by the appended claims.

What is claimed is:

1. A method of reproducing a color of an image in a recorded material at a printing side requested by a customer, comprising steps of:
   sending a profile creation tool for a device for forming the image from the printing side to the customer,
   creating profile data of the device at the customer using the profile creation tool,
   transmitting the profile data and image data of the image in the recorded material from the customer to the printing side, and
   reproducing the color of the image in the recorded material and recording in a material at the printing side,
   wherein said profile creation tool comprises data including a basic color chart, a basic color chip image, a basic color chip printing condition and a digital imaging condition of basic color, and a software including a profile creation software.

2. A method of reproducing a color of an image according to claim 1, wherein said recorded material is a printed material, and the image data is data for creating the image data of the printed material.

3. A method of reproducing a color of an image according to claim 1, wherein said steps of sending and transmitting are performed at Internet.

4. A method of reproducing a color of an image according to claim 1, wherein said step of reproducing the color of the image is printing the image on a textile fabric.

5. A method of reproducing a color of an image in a recorded material at a printing side requested by a customer, comprising steps of:
   sending basic profile data of a device for forming the image at the customer, and image data of the image obtained by the device from the customer to the printing side,
   creating a profile of the device at the printing side using the basic profile data, and
   reproducing the color of the image in the recorded material based on the profile and the image data and recording in another material at the printing side,
   wherein said basic profile data is two kinds of digitized image data comprising printed material of the basic color chip image and basic color chart.

6. A method of reproducing a color of an image in a recorded material at a printing side requested by a customer, comprising steps of:

sending basic profile data of a device for forming the image at the customer, and image data of the image obtained by the device from the customer to the printing side, creating a profile of the device at the printing side using the basic profile data, and reproducing the color of the image in the recorded material based on the profile and the image data and recording in another material at the printing side, wherein said basic profile data is a printed material of a basic color chip image.

7. A method of reproducing a color of an image according to claim 5, wherein said recorded material is a printing material.

8. A method of reproducing a color of an image according to claim 7, wherein said image data is data for creating the image data of the printed material.

9. A method of reproducing a color of an image according to claim 6, wherein said recorded material is a printing material.

10. A method of reproducing a color of an image according to claim 9, wherein said image data is data for creating the image data of the printed material.

* * * * *